United States Patent [19]

Fukuchi et al.

[11] Patent Number: 4,549,191

[45] Date of Patent: Oct. 22, 1985

[54] MULTI-NOZZLE INK-JET PRINT HEAD OF DROP-ON-DEMAND TYPE

[75] Inventors: Hiromichi Fukuchi; Toyoji Ushioda, both of Tokyo, Japan

[73] Assignee: NEC Corporation, Tokyo, Japan

[21] Appl. No.: 627,806

[22] Filed: Jul. 5, 1984

[30] Foreign Application Priority Data

Jul. 4, 1983 [JP] Japan ................................ 58-121301

[51] Int. Cl.[4] ............................................ G01D 15/16

[52] U.S. Cl. ................................................ 346/140 R

[58] Field of Search .................................. 346/140, 75

[56] References Cited

U.S. PATENT DOCUMENTS 3,747,120 7/1973 Stemme .......................... 346/140 X 3,946,398 3/1976 Kyser ............................. 346/140 X 3,988,745 10/1976 Sultan ................................ 346/140

4,158,847 6/1979 Heinzl ................................ 346/140

*Primary Examiner*—Joseph W. Hartary

*Attorney, Agent, or Firm*—Laff, Whitesel, Conte & Saret

[57] ABSTRACT

A multi-nozzle ink drop-on-demand type of ink-jet printing head is able to deliver ink droplets at a higher rate of speed through a use of capillary action. Each of the many nozzles receives the ink required to form a droplet from an individually associated pressure chamber which is squeezed by its own (preferably piezoelectric) driving transducer. A capillary supply path bypasses each of the pressure chambers to provide an initial ink supply which is the start of a droplet formation that is completed upon the operation of the driving transducer. Thus, a time lag is eliminated, which would otherwise be required to start the droplet formation, and that lag elimination enables a faster ink jet response.

14 Claims, 6 Drawing Figures

MULTI-NOZZLE INK-JET PRINT HEAD OF DROP-ON-DEMAND TYPE

This invention relates to a drop-on-demand type ink-jet print head, and more particularly to a multi-nozzle ink-jet print head having a plurality of nozzles arranged in line.

Various types of ink-jet printers have been proposed as described in an article entitled "Ink Jet Printing", by Fred. J. Kamphoefner, published in the *IEEE TRANSACTIONS ON ELECTRON DEVICES,* Vol. EL-19, No. 4, April, 1972, pp. 584–593. The ink-jet print head of a drop-on-demand type is described in detail, for example, in U.S. Pat. No. 3,946,398, entitled "METHOD AND APPARATUS FOR RECORDING WITH WRITING FLUIDS AND DROP PROJECTION MEANS THEREFOR" issued to E.L. Kyser et al., and in U.S. Pat. No. 4,074,284, entitled "INK SUPPLY SYSTEM AND PRINT HEAD", issued to J.L. Dexter et al.

In a conventional multi-nozzle ink-jet print head, when an ink droplet is not ejected, the ink which is used to form the droplet is maintained in an equilibrium state by properly maintaining a head pressure difference between nozzles and an ink reservoir, so that ink will not flow through the nozzles. The permissible head pressure difference is 1 to 2 cm$H_2O$. As the number of nozzles increases, however, the head pressure difference tends to increase, and it becomes difficult to maintain the head pressure difference at the permissible value. As a result, the ink may easily flow from the nozzles even when no driving voltage is applied. Further, since the nozzles are wet, an ink ejecting direction is unstable. Furthermore, after the ink has been ejected from the nozzles, it is necessary to supplement the ink by replacing an amount equal in volume to the ink that was ejected from the nozzles. The ink supplement taken from the ink reservoir to the nozzles flows through pressure chambers owing to capillary forces; thus, the supplementing time depends strongly on the shape and volume of the pressure chambers. In practice, a time period of several hundreds of microseconds is needed for the ink supplement. Therefore, the maximum droplet ejecting frequency has been limited to about 4,000 dots/second.

It is, therefore, an object of this invention to provide a multi-nozzle ink-jet print head on a drop-on-demand type in which the ink is maintained in an equilibrium state even when the number of the nozzles is increased.

It is another object of this invention to reduce the time period for a multi-nozzle ink-jet print head to resupply the ink supplement, whereby ink droplets can be ejected from the nozzles at a higher droplet ejecting frequency.

According to this invention, a multi-nozzle ink-jet print head of a drop-on-demand type has a plurality of ink ejection channels having a plurality of nozzles and pressure chambers which are connected to a common ink reservoir through an ink-supply portion. The ink-supply portion is formed to have dimensions which are small enough to attract ink due to capillary forces. The ink is supplied from the ink reservoir to the ejection chamber owing to the capillary attraction created by the ink-supply portion. Small volume capcaity areas are provided between the nozzles and the pressure chambers. The areas are connected through ink-supply paths, which are provided independently of the pressure chambers, to the ink reservoir.

The features and advantages of this invention will be better understood from the following detailed description of preferred embodiments of this invention taken in conjunction with the accompanying drawings, wherein.

Figure 1:
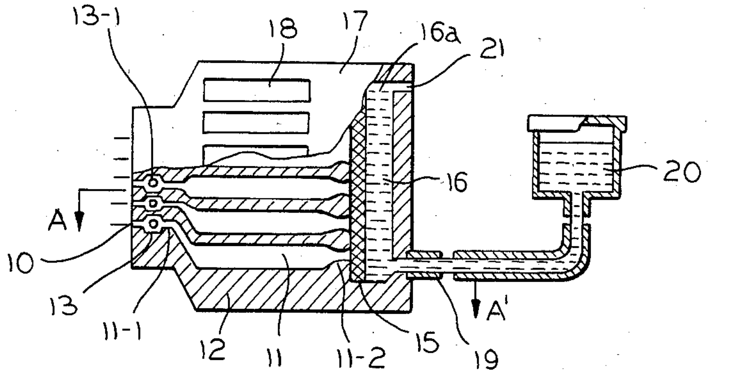
FIG. 1 is a side view of a first embodiment of this invention.
Figure 2:
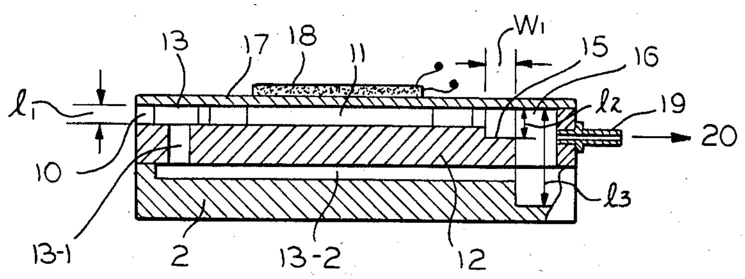
FIG. 2 is a sectional view of the first embodiment taken along the line A—A′ in FIG. 1.

FIGS. 1 and 2 show a multi-nozzle ink-jet print head according to a first embodiment of this invention. A plurality of ink ejection channels have pressure chambers 11 located between individually associated nozzles 10 and a common ink reservoir 16, the channels and chambers being formed in an upper substrate 12. A thin flexible upper plate 17, made of a glass ceramic or stainless steel, is adhesively fixed on the upper substrate 12. A plurality of individually associated electromechanical transducer elements 18, such as piezoelectric elements, are fastened to the upper plate 17 at positions corresponding to the pressure chambers 11.

Capacity areas 13 have volumes which are smaller than the volumes of the pressure chambers 11. Areas 13 are located between the nozzles 10 and the pressure chambers 11 to stably form the ink droplets and to prevent air bubbles from entering the pressure chambers 11 through the nozzles 10. In the capacity areas 13, there are ink supply holes 13-1, each having a minute diameter of 0.05–0.3 mm. The ink supply holes 13-1 are connected to the common ink reservoir 16 via ink supply paths 13-2 formed in a lower substrate 2 and for feeding the ink to the supply holes, owing to the capillary attraction created therein.

Between the pressure chambers 11 and the ink reservoir 16, a thin layer ink-supply portion 15 is provided. The ink-supply portion 15 is formed by etching and has a depth $l_2$ of about 0.03 to 0.2 mm (See FIG. 2). Owing to the capillary attraction occurring in the portion 15, the ink can be supplied from the common ink reservoir 16 to the respective ink ejection channels, each of which comprises the pressure chamber 11, the capacity area 13, and the nozzle 10.

The first embodiment further comprises an ink supply port 19 connected to an ink tank 20, for supplying the ink in the tank 20 through port 19 to the common ink reservoir 16 having an air vent 21. When the ink is to be supplied to the print head, a high pressure is applied to the ink in the ink tank 20 whereby the ink is forcibly supplied through the ink supply port 19 to the print head. At this time, the air vent 21 is used for ventilating the air from the print head. The pressure applied to the ink tank 20 is set so that an upper surface of the ink in the ink reservoir 16 reaches a level **16*a***.

The ink supplied from the ink tank 20 (FIG. 1) is temporarily stored in the ink reservoir 16. The ink is supplied to the pressure chambers 11 by way of the ink supply portion 15, and also to the ink supply holes 13-1 and the capacity areas 13 by way of the ink supply paths 13-2 (FIG. 2), owing to the capillary attraction provided by the ink supply portions 15 and 13-2, respectively.

When a driving voltage is applied to at least one of the electromechanical transducer elements 18, an internal stress arises in the transducer element to deform and curve the wall of the pressure chamber 11. When the wall is curved inwardly into the pressure chamber 11, the internal volume of the pressure chamber decreases and an impact wave is generated within the ink in the pressure chamber 11. The impact wave is accelerated and transferred to the nozzle 10 whereby the ink is ejected from the nozzle 10, as an ink droplet.

A component of the impact wave which is transferred toward the ink reservoir 16 is weakened by a suppressing effect of the thin layer ink supply portion 15, thereby preventing an ink flow from the other nozzles of corresponding ejection channels in which the driving voltage is not applied to the transducer element 18. It is enough for the ink reservoir 16 to temporarily store the ink supplied from the ink tank 20. Therefore, it is not necessary to maintain the balance between the static pressure of ink in the ink reservoir 16 and the surface tension at the nozzles 10, as is maintained in a conventional print head.

After the ink droplet is ejected from the nozzle 10 by means of a pumping action of the pressure chamber 11, an amount of ink corresponding to the ejected amount is suplied from the ink reservoir 16 through the ink supply portion 15 and the ink supply paths 13-2 to the pressure chamber 11 and the capacity area 13 owing to the capillary attraction provided in the ink supply portion 15 and the ink supply paths 13-2.

In this embodiment, because the ink supply hole 13-1 is five or more times larger in sectional area as compared to the area of narrow portions 11-1 and 11-2 at both ends of the pressure chamber 11. A composite flow resistance of the flow path including the ink supply path 13-2 and the ink supply hole 13-1 is negligibly small in comparison with the flow resistance of the pressure chamber 11. As a result, in the ink supplement, the major part of the ink to be supplemented is passed from the ink reservoir 16 through the ink supply path 13-2 and the ink supply hole 13-1 to the nozzle 10 and the pressure chamber 11. Therefore, the ink supplementing time period can be extremely reduced whereby the droplet ejecting frequency can be increased to 5000 or more dots/second. The ink supplementing time period depends on the ink characteristics, sectional shapes and areas of the nozzle, capacity area and the ink supply hole, and on the applied voltage waveform.

It is considered that an amount of ink supplied through the ink supply path 15 to the pressure chamber 11 is equal to or less than 15% of the amount of ink that is supplied through the ink supply path 13-2 to the nozzle 10. The ink in the pressure chamber 11 can be gradually replaced with new ink by repeating the ink ejecting operation, thereby preventing a degeneration of the ink in the pressure chamber 11.

Because the ink supply holes 13-1 and the ink supply paths 13-2 constitute the ink flow paths independently of each other, with respect to the capacity areas 13, the pressure variation generated in the capacity area 13 at the ink droplet ejection is not influenced to the adjacent capacity area 13. This makes it possible to provide a high speed printing.

Because the ink supply portion 15 is thin, that is, has a depth of 0.04–0.2 mm, the ink rises owing to the capillary attraction provided therein, from which the ink can be supplied uniformly to the ejection channels. The suppressing effect of the thin layer ink supply portion 15 makes it difficult for air bubbles to enter the pressure chamber 11, whereby the pressure chamber 11 can always produce a normal impact wave.

As described above, a major part of the ink supplement to nozzle 10 is supplied from the ink reservoir 16 through the ink supply path 13-2 and the ink supply hole 13-1 owing to the capillary attraction therein. Thus, it is unnecessary to maintain the balance between the surface tension of ink at the nozzle 10 and the static pressure of ink in the ink reservoir 16. Accordingly, the number of the nozzles 10 can be considerably increased, and an accurate control of the static pressure of ink in the ink reservoir 16 is not necessary.

Figure 3:
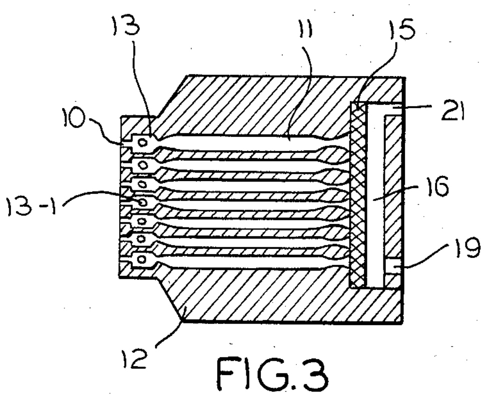
FIGS. 3 and 4 are plan views of upper and lower substrates in a second embodiment of this invention, respectively.
Figure 4:
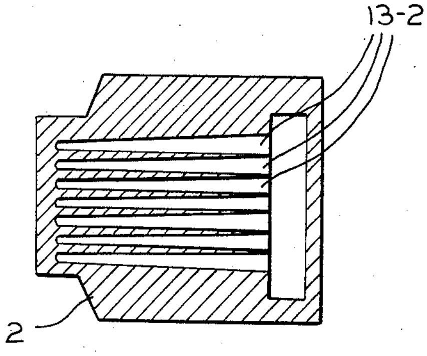

In FIGS. 3 and 4, a second embodiment of the inventive multi-nozzle print head is identical to the first embodiment of the print head except for the shapes of the ejection channels including the nozzles 10, the capacity areas 13 and the pressure chamber 11, and for the shapes of the ink supply holes 13-1 and the ink supply paths 13-2.

Figure 5:
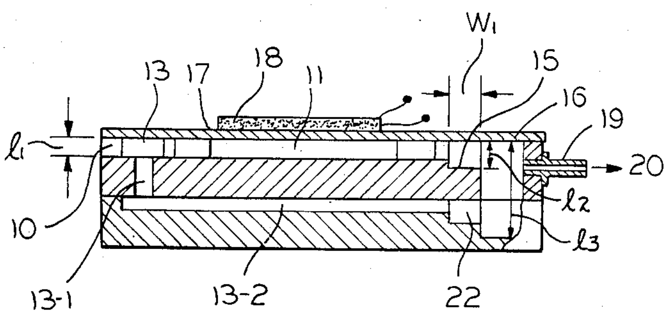
FIG. 5 is a sectional view of a third embodiment of this invention.
Figure 6:
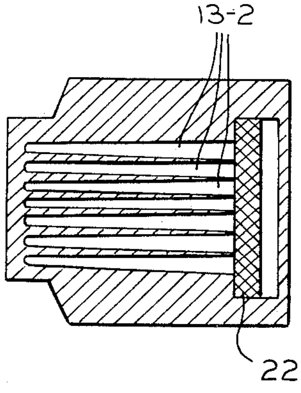
FIG. 6 is a plan view of a lower substrate in the third embodiment.

In FIGS. 5 and 6, a third embodiment of the inventive multi-nozzle print head is identical to the print head according to the first or second embodiment. It further comprises thin layer ink supply portion 22 commonly provided between the individual ink supply paths 13-2 and the common ink reservoir 16. Portion 22 has a depth substantially equal to that of the ink supply portion 15. In this embodiment, because both of the ink supply portions 15 and 22 are connected directly to the ink reservoir 16, the ink in the ink reservoir 16 can be supplied through the thin layer ink supply portions 15 and 22 to the ejection channels and ink supply paths 13-2, respectively, owing to the capillary attraction provided therein. This makes it possible to supply the ink in the ink reservoir 16 event when the upper surface of the ink in the ink reservoir 16 is lower than the height of the uppermost ejection channel.

In FIGS. 2 and 5, assume that the depths of the pressure chambers 11, the ink supply portion 15, and the ink reservoir 16 are represented by $l_1$, $l_2$ and $l_3$, respectively. Experiments show that it is desirable to satisfy the following:

$$l_3 > l_2 \geqq l_1$$

$$l_1 = 0.03 \text{ to } 0.3 \text{ mm}$$

$$l_2 = 0.03 \text{ to } 0.2 \text{ mm}$$

$$l_3 = 0.5 \text{ to } 3 \text{ mm}$$

It is desirable to make the pressure chambers 11 and the ink supply portion 15 have the same depth to minimize etching costs. Further, in our experiments, the best results have been obtained when the ink supply portion 15 has the depth $l_2$ of 0.03 to 0.2 mm and the width W of 0.5 to 3 mm.

Furthermore, it is desirable for the capacity area 13 to have a width which is 1.3 to 3 times as wide as the width of the nozzle 10 and a length of 0.2 to 8.0 mm. Best results have been obtained when area 13 has the width of 0.06–0.3 mm and the length of 0.2–2.0 mm.

It is desirable for the ink supply hole 13-1 to have a diameter of 0.05–0.25 mmϕ, and for the ink supply path 13-2 to have a depth of 0.05–0.4 mm.

Although the capacity areas 13 in the above embodiments are spread in a direction of width, it is possible to deepen or to both spread and deepen areas 13 to obtain the necessary capacity.

As described above, in the inventive print heads, the ink at the nozzles 10 can be balanced depending on only the surface tension at the nozzles. Thus, it is possible to use a number of nozzles. Further, since the ink is supplemented from the ink reservoir 16 through the ink supply path 13-2 and the ink supply hole 13-1 directly to an ejection end portion (the capacity area 13) of the print head, owing to the capillary attraction provided therein, it is possible to reduce a length of ink flow and to provide a multi-nozzle print head in which the ink droplets can be stably ejected at a rate of 5000 or more dots/seconds without entering the air bubbles.

Those who are skilled in the art will readily perceive how to modify the invention. Therefore, the appended claims are to be construed to cover all equivalent structures which fall within the true scope and spirit of the invention.

We claim:

1. An on-demand type ink-jet print head for ejecting ink droplets, said print head comprising:

a plurality of nozzles for ejecting said ink droplets;

a common ink reservoir filled with ink;

a plurality of pressure chambers located between said nozzles and said ink reservoir to receive and hold ink supplied from said reservoir, means individually associated with each of said chambers for individually exerting pressure on the ink in each of said chambers for ejecting said ink droplets from selected ones of said nozzles;

a first ink supply portion located between said pressure chambers and said ink reservoir for supplying said ink from said ink reservoir to said pressure chambers, said first ink supply portion having a depth which is small enough to provide a capillary attraction of said ink from said ink reservoir;

capacity areas located between said nozzles and said pressure chambers, said capacity areas having dimensions which are smaller that the dimensions of said pressure chambers; and ink supply paths located between said capacity areas and said ink reservoir, the ink being supplied from said ink reservoir through said ink supply paths to said capacity areas.

2. The print head as claimed in claim 1, further comprising a second ink supply portion located between said ink supply paths and said ink reservoir for supplying said ink from said ink reservoir to said capacity areas, said second ink supply portion having a depth which is small enough to provide a capillary attraction for said ink from said ink reservoir.

3. The print head as claimed in claim 2, wherein said first and second ink supply portions has substantially the same depth.

4. The print head as claimed in claim 1, wherein said depth of said ink supply path is less than the depth of said ink reservoir.

5. The print head as claimed in claim 1, wherein said first ink supply portion has a depth between 0.03 and 0.3 mm.

6. The print head as claimed in claim 1, wherein depths $l_1$, $l_2$ and $l_3$ of said pressure chambers, first ink supply portion and ink reservoir, respectively, have the following relationship $$l_3 > l_2 \geqq l_1.$$

7. The print head as claimed in claim 6, wherein said depths $l_1$, $l_2$ and $l_3$ are in the ranges of 0.03 to 0.3 mm, 0.03 to 0.2 mm and 0.5 to 3 mm, respectively.

8. A multi-nozzle ink jet printing head comprising a plurality of nozzles, a common reservoir holding a bulk supply of ink for all of said nozzles; a plurality of ink supply paths extending from said common reservoir to individually associates ones of said nozzles; each of said paths individually associated with a nozzle comprising a pressure chamber and a by-pass capillary tube extending from said reservoir around said pressure chamber to an area in said path near said nozzle, whereby said capillary tube provides a preliminary supply of ink to said nozzle prior to the activation of said nozzle, and transducer means individually associated with each of the pressure chambers for selectively driving ink droplets out the nozzle of a path associated with an activated transducer means, whereby said preliminary supply of ink is the start of a droplet formed when said transducer is activated.

9. The ink jet printing head of claim 8 and capacity areas positioned between said nozzles and pressure chambers in each of said paths, said capillary tubes being connected to supply ink to said capacity areas, each of said capacity areas having a volume which is less than the volume of the pressure chamber associated therewith.

10. The ink jet printing head of claim 9 and a thin layer ink supply channel positioned between said common reservoir and the pressure chambers in each of said individually associated paths, said thin layer ink supply channel having dimensions which provide a capillary action for supplying ink to said pressure chambers.

11. The ink jet printing head of claim 10 wherein said pressure chamber has a depth $l_1'$ said thin layer ink supply has a depth $l_2$, and said common reservoir has a depth $l_3$, the depth relationships being $$l_3 > l_2 \geqq l_1.$$

12. The ink jet printing head of claim 11 wherein the respective depths are in substantially the following ranges:

$$l_1 = 0.03 - 0.3 \text{ mm}$$

$$l_2 = 0.03 - 0.2 \text{ mm}$$

$$l_3 = 0.5 - 3 \text{ mm}.$$

13. A multi-nozzle ink jet printing head comprising:

a first substrate having a first side with a plurality of ink supply paths debossed therein, each of said supply paths extending from a large common cavity area through a relatively thin common area to an individual path comprising a relatively large pressure cavity to a relatively small capacity cavity and then to an exit, a thin and flexible plate covering said debossments to define each of said supply paths by confining said large common cavity to form a common ink reservoir, to form each of said large pressure cavities into a pressure chamber, to confine said small cavity and thus form a capacity area for holding a preliminary ink supply and to confine each of said exits and thus form a nozzle which is supplied with ink from said capacity area;

transducer means positioned on said thin plate over individually associated ones of said pressure chambers for flexing said plate over said associated pressure chamber and driving ink droplets out the nozzle associated therewith;

a second substrate laminated to an opposite side of said first substrate, a plurality of capillary channels debossed in the surface between said first and second substrates, each of said capillary channels being individually associated with a path and extending from said common ink reservoir to an individually associated capacity area formed by said small cavities, whereby each of said capillary channels provides a by-pass around individually associated ones of said large pressure chambers for presupplying ink to said small cavities forming a capacity area, said presupply of ink being transported in response to a capillary action.

14. The ink jet printing head of claim 13 and a relatively shallow common debossment positioned between said common cavity forming said ink reservoir and an end of each of said debossed supply paths which is opposite an end with said exit, said shallow debossment having dimensions for supplying ink from said reservoir to the pressure chambers in each of said supply paths responsive to a capillary action within said shallow debossment.

* * * * *